Figure 1:
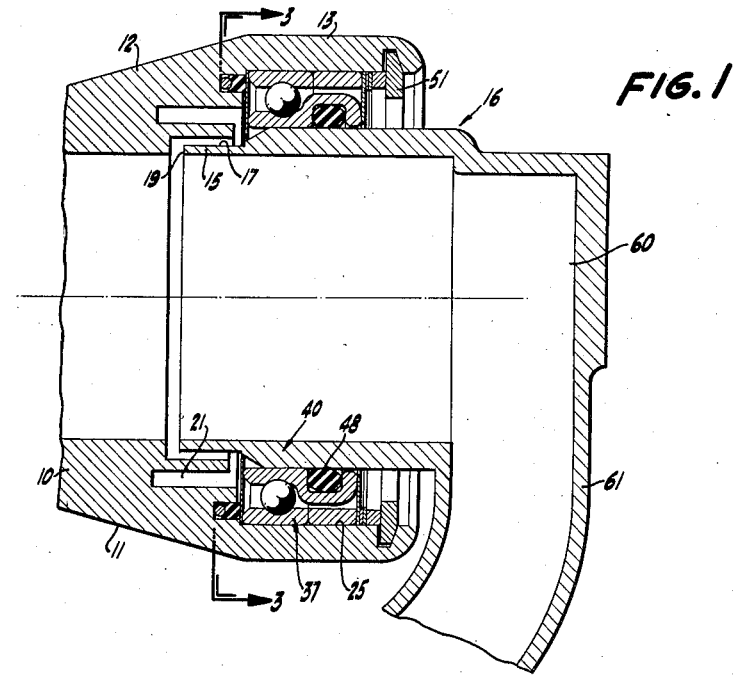

Oct. 23, 1956 T. I. MOSELEY ET AL 2,768,358
SEALED ROTATABLE JOINT FOR RADIO FREQUENCY WAVE GUIDE
Filed Dec. 11, 1951

INVENTORS
TOMLINSON I. MOSELEY
PAUL E. CONKLIN
BY
Mellin and Hanson
ATTORNEYS

United States Patent Office 2,768,358
Patented Oct. 23, 1956

2,768,358

SEALED ROTATABLE JOINT FOR RADIO FREQUENCY WAVE GUIDE

Tomlinson I. Moseley, Atherton, and Paul E. Conklin, Los Altos, Calif., assignors to Dalmo Victor Company, San Carlos, Calif., a corporation of California Application December 11, 1951, Serial No. 261,012

3 Claims. (Cl. 333—98)

This invention relates to joints for radio frequency wave guides and is particularly concerned with rotary joints for radio frequency guides such as used in rectangular wave guide transmission lines in airborne radar equipment.

Considerable difficulty and serious problems have been encountered in providing a joint in transmission lines of the character set forth, particularly with respect to sealing of the joints where the equipment is subjected to extremes of temperature. In particular, failures have occurred under such conditions in connection with the use of the more conventional sealing means, such as neoprene rubber or like resilient packing materials. The problem is particularly acute at rotary joints, since constant air pressure must be maintained and a radio frequency choke must be embodied, as well as a radio frequency seal, together with a close fitting freely moving mechanical connection.

It is therefore among the primary objects of the present invention to provide a novel and improved joint for radio frequency wave guides having as a part thereof a metallic seal so incorporated into the joint that it functions as one wall of a radio frequency choke while at the same time providing an air seal and radio frequency seal between parts of the joint moving relative to one another.

Another object of the present invention is to provide a compact rotary joint.

Another object of the present invention is to provide a rotary connection incorporating a bearing having an outer race and an inner race and wherein a resilient seal is provided to prevent the leakage of air between one race and the wall surface which it engages, which seal also functions to prevent relative rotation between said one race and said wall surface.

A further object of the present invention is to provide a novel and improved rotary joint for rectangular wave guide transmission lines by means of which an efficient seal against air leakage may be maintained.

A further object of the present invention is to provide a wave guide transmission joint embodying an efficient and effective air seal to prevent the loss of air pressure therein and to incorporate with such air seal a close fitting mechanical joint provided with suitable bearings and to provide, in addition thereto, a radio frequency seal and choke.

Another more specific object of the present invention is to provide a novel and improved metallic sealing means for a radio frequency transmission line joint by which means the seal is unaffected by temperature extremes which might deleteriously affect sealing means of neoprene rubber and like materials.

Another important object of the present invention is to provide a joint of the character set forth which is simple, efficient and effective, may be readily assembled and disassembled, and which is admirably suited to meet the demands of economic manufacture.

Numerous other objects and features of the present invention will be apparent from consideration of the following specification taken in conjunction with the accompanying drawings, in which Fig. 1 is a vertical longitudinal section through one preferred embodiment of the present invention.

Figure 2:
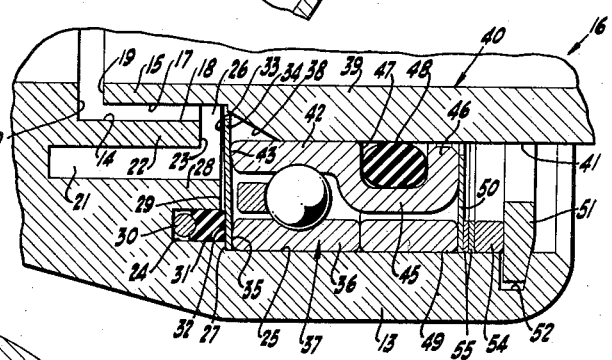
Figure 3:
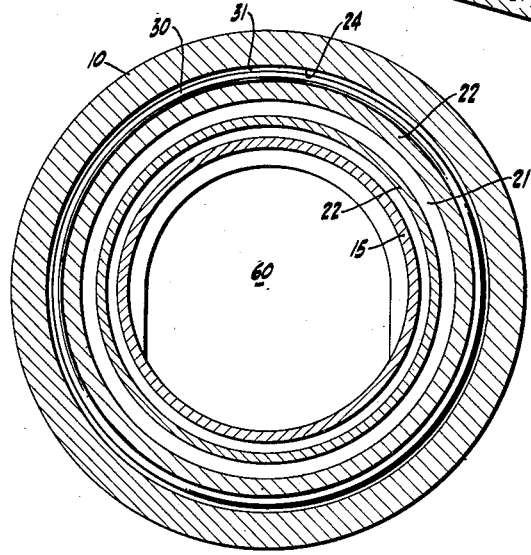

Fig. 2 is an enlarged detail section of one side of the joint, shown in Fig. 1, and Fig. 3 is a vertical transverse section taken along the line 3—3 of Fig. 1.

In general terms, the present invention may be defined as comprising a rotary wave guide joint having a labyrinth choke formed between the opposed moving parts of the joint, which joint includes as a part thereof a fixed thin flexible metallic annulus functioning as one wall of the choke and engaging one rotating race of a ball bearing so as to provide an air seal to prevent the escape of air from the joint and to provide a radio frequency seal to prevent the escape of radio frequency energy between the outer and inner races.

Referring more particularly to the drawings, a relatively rotary circular magnesium wave guide section is indicated by the numeral 10, which is here shown as having an outwardly tapering wall 11 at the joint end thereof forming a head 12 of substantially greater thickness than the body of the guide and terminating in an end portion 13 the internal dimensions of which are substantially greater than the internal dimensions of the guide so as to provide an external casing for the bearing and sealing means.

Adjacent the end portion 13 and within the head 12 the tube 10 is provided with a counterbore or recess 14 which is adapted to receive a terminal flange or neck 15 of a swiveling joint connection, generally indicated by the numeral 16. As is clearly indicated in Figs. 1 and 2, the outer wall 17 of the terminal neck 15 is inwardly spaced from the inner face 18 of the recess 14 so as to provide a substantial spacing therebetween. The end 19 of the neck 15 is also outwardly spaced with respect to the transverse shoulder 20 at the inner end of the recess 14. Such spacing provides a passage from the interior of the wave guide 10 radially outward between the ends 19 and 20 and longitudinally forward between the side walls 17 and 18.

The head 12 is further provided with a longitudinally extending peripheral channel 21 which is spaced from the counterbore 14 by a wall 22. The forward terminal edge 23 of the wall 22 terminates short of the terminal shoulder 27 which terminates a counterbore 25 formed in end portion 13. By this arrangement a second radial passage 26 is provided across the end 23 which communicates with the passage formed between the walls 17 and 18 and joins that passage with the channel 21. This arrangement of intercommunicating passages will be seen to provide a radial outward passage from the wave guide 10 which in turn communicates forwardly between the walls 17 and 18, constituting a parallel passage which again turns outwardly around the end 23 of the wall 22 and thus opening into the channel 21. This arrangement of passages, which is effectively sealed against both air loss and radio frequency leak by the sealing means hereinafter described, provides an adequate and effective "labyrinth" area which acts as a radio frequency choke for the joint.

Outwardly surrounding and spaced from the channel 21 the head 12 is provided with a recess 24 outwardly spaced from the channel 21 by an intermediate wall 28 and inwardly spaced from the bore 25 by a shoulder 27. It may be noted, however, that the inner edge 29 of the wall 28 is spaced slightly inwardly from the shoulder 27. Mounted within the recess 24 there is provided a wire ring 30 of circular cross-section upon which is seated an O ring or like resilient packing 31 preferably formed of neoprene rubber or equivalent resilient material and preferably so dimensioned with respect to the width and depth of the recess 24 that it will seat on the wire 30 and press against the opposite side walls of the recess as well as extend forwardly out from the recess beyond the edge 29 and the shoulder 27.

The outwardly urged face 32 of the O ring 31 bears against the inner face 33 of a thin flexible washer 34 preferably formed of spring steel. The external dimensions of the washer 34 are such as to substantially conform with the sides and configuration of the inner bore 25 of the end portion 13. The extreme edge portion of the washer 34 therefore lies adjacent the shoulder 27. The pressure of the face 32 of the O ring against the inner surface 33 of the washer 34 urges the washer outwardly and against the inner face 35 of an outer ball race 36 of a bearing assembly, generally indicated at 37. The outer surface of the race 36 is snugly fitted in the bore 25 of the end portion 13. This arrangement is such that the pressure from the O ring 31 will act to seal the washer 34 against the inner face 35 of the outer race 36 and secure it tightly thereagainst in fixed relation with respect thereto, providing an air seal at this point. It is pointed out that washer 34 is not disposed at or closely adjacent to the mouth of the choke where the tendency of radio frequency energy to leak is great, but is located at the midpoint of the choke length where the tendency of radio frequency energy to leak is much less.

From its contact with the O ring surface 32, the washer 34 extends inwardly to a tapering surface 38 extending from the neck 15 of the member 16 to the external wall 41 of the head 40 of the member. The external surface 41 of the head 40 receives the surface of the inner bearing race 42 of the bearing 37. In addition to sealingly engaging the outer ball race 36 at the inner surface 35, the washer 34 bears against the inner end 43 of the inner race 42 and it is preferable that the face 43 of the inner race extend inwardly of the direction of the washer and the labyrinth and the wave guide section 10 a slight degree, as shown in Fig. 2, in order to maintain a pressure in that direction upon the inner portion of the annular washer. Thus, although difficult of clear depiction in drawings, it should be noted that the inner end 43 of the inner ball race 42 extends inwardly towards the wave guide section 10 to a slight extent as, for instance, in an amount in the neighborhood of .002 inch so as to insure a close bearing contact which effectively maintains an air seal and a radio frequency seal between the washer 34 and the inner bearing race 42 of the bearing 37.

The outer ball race 36 of the bearing 37 is of conventional form being a substantially short cylindrical member adequately recessed for the reception of the bearing balls. A ball retainer is provided as shown for separating the balls. However, the inner ball race 42 which bears against the outer surface 41 of the head 40 has an extended section formed by an outwardly turned neck 45 terminating in an inwardly extending flange 46. This configuration forms an annular pocket 47 within which is mounted an O ring 48 which sealingly engages the surface 41 to further preclude any leakage through the joint and to prevent rotation between inner race 42 and head 40. To compensate for the increased outward extension of the inner race 42 by the neck 45 and the flange 46 there is provided a compensating spacer ring 49 receivable within bore 25 and engaging the antiseal face of the outer race 36.

The antiseal face of the spacer ring 49 and the flange 46 are substantially parallel, and against them there is positioned an oil sealing ring 50. The entire assembly is secured in position by a split ring 51 resiliently sprung into a groove 52 near the outer end of the end portion 13. A spacer ring 54 and, if desired, suitable spacing shims 55 provide for the adequate securement and adjustment of the parts in the position illustrated. As so assembled, the outer face of the disc washer 34 is urged by sealing O ring 31 into sealing engagement with the outer bearing race 36, while the pressure thus obtained acts upon the surface 43 of the inner race to securely seal the washer 34 against such surface. In the construction here described it is preferable that the surface 43 be lapped or otherwise formed with more than conventional smoothness so as to adequately seal tightly against the outer surface of the washer 34.

As indicated at 60, the body 40 of the swivel member 16 is conventionally arranged to be rigidly secured with a continuation indicated at 61 of the wave guide transmission lines.

From the foregoing it will be readily seen that the present invention provides an adequately sealed rotary joint for radio frequency transmission lines which joint provides in addition to neoprene rubber or like sealing means a metallic sealing element which will not be subjected to failures in the presence of widely varying temperatures and the joint further provides a mechanically arranged swivel with adequate bearing members between the rotary parts and, in addition thereto, provides a radio frequency seal and a radio frequency choke in the form of a labyrinth. In manufacture and assembly of the present invention it will, of course, be understood that efficient and effective sealing may be achieved only by accuracy in the design and finish of the parts employed. However, it is to be noted that the assembly provides adequate sealing for transmission lines of the character set forth with a minimum number of parts and with due regard to simplicity of construction such as will render the device susceptible to manufacture within the demands of economy and it will be noted that the assembly is such that by a simple manipulation of the split ring 51 assembly and disassembly may be achieved with a minimum of difficulty.

In consideration of the present invention it will be understood that the inventive concept is not confined to the specific structural details herein set forth and that in the practice of the invention numerous changes and modifications and the full use of equivalents may be resorted to without departing from the spirit or scope of the invention as outlined in the appended claims.

Having thus described our invention, what we claim and desire to secure by Letters Patent is:

1. A rotary wave guide joint comprising a first and second member connected in telescoping end to end relation and having aligned radio frequency transmitting passages, an annularly extending radio frequency choke formed between the members at their telescoping ends, an anti-friction bearing having inner and outer races disposed between said first and second members, an annular air-tight metal sealing disc seated within the first member in engagement with the adjacent end of the outer race of the bearing and having an annular portion extending radially inwardly into sealing engagement with the adjacent end of the inner race, said annular sealing disc forming one wall of the radio frequency choke, and air-tight sealing means disposed between each race and its adjacent member.

2. A rotary wave guide joint comprising a first and second member in end to end telescoping relation and having formed therein aligned radio frequency transmitting passages, an annularly extending radio frequency choke formed between the members at their adjacent ends, said first member having a housing portion telescoping with said second member, a thin flexible annular metal disc mounted in the housing portion of the first member, a portion of the inner surface of said disc serving as one wall of said choke with the inner circumferential portion of the disc contacting the second member, sealing means in the first member contacting the adjacent surface of the disc near its outer circumference, anti-friction bearing means having inner and outer races disposed between the first and second members, an end of the outer race of said bearing engaging the disc near its outer circumference and the inner race of said bearing being inwardly offset relative to the outer race for sealingly engaging the disc, sealing means disposed between the inner race and the second member, and means releasably locking the anti-friction bearing between said first and second members.

3. A rotary wave guide joint for use in wave guide systems where the internal air pressure is greater than the ambient air pressure, said joint having relatively rotatable first and second members connected in end to end telescoping relation and having formed therein aligned radio frequency transmitting passages and an annularly extending radio frequency ½ wave length choke formed between the members at their adjacent ends, anti-friction bearing means having an outer and an inner race disposed between and engaging respectively with telescoping portions of the first and second members, and air sealing means preventing the escape of air from the joint between the adjacent ends of the members, said air sealing means comprising a thin flexible metal annulus disposed between said first and second members in sealing engagement with the adjacent ends of the races and formnig one wall of said radio frequency choke at the ¼ wave length, a resilient sealing member carried by said first member and positioned to provide a seat for said annulus and operable for holding said annulus in sealing engagement with adjacent ends of the inner and outer races of said bearing to prevent air from escaping between said inner and outer races, and a sealing member disposed between the inner race and the second member to prevent air from escaping between the inner race and the second member.

References Cited in the file of this patent

UNITED STATES PATENTS

| | | |
|---|---|---|
| Re. 23,283 | Browne | Oct. 17, 1950 |
| | (Original No. 2,270,928) | |
| 2,345,019 | Van Alstyne | Mar. 28, 1944 |
| 2,356,351 | Phillips | Aug. 22, 1944 |
| 2,430,445 | Aamodt | Nov. 11, 1947 |
| 2,451,876 | Sailsbury | Oct. 19, 1948 |
| 2,452,144 | Phillips | Oct. 26, 1948 |
| 2,512,148 | Gaines | June 20, 1950 |
| 2,532,669 | Jones | Dec. 5, 1950 |
| 2,541,836 | Sailsbury | Feb. 13, 1951 |
| 2,584,399 | Preston | Feb. 5, 1952 |
| 2,600,434 | Saywell | June 17, 1952 |